United States Patent
Dou et al.

(10) Patent No.: US 11,801,857 B2
(45) Date of Patent: Oct. 31, 2023

(54) CONTROL METHOD AND DEVICE FOR DRIVER ASSISTANCE

(71) Applicant: NIO TECHNOLOGY (ANHUI) CO., LTD, Hefei (CN)

(72) Inventors: Yaoyuan Dou, Shanghai (CN); Panpan Chen, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 17/839,777

(22) Filed: Jun. 14, 2022

(65) Prior Publication Data
US 2022/0410919 A1 Dec. 29, 2022

(30) Foreign Application Priority Data
Jun. 23, 2021 (CN) .......................... 202110702159.8

(51) Int. Cl.
*H04N 5/44* (2011.01)
*B60W 50/14* (2020.01)
*B60W 40/072* (2012.01)
*B60W 40/105* (2012.01)

(52) U.S. Cl.
CPC .......... *B60W 50/14* (2013.01); *B60W 40/072* (2013.01); *B60W 40/105* (2013.01); *B60W 2050/143* (2013.01); *B60W 2552/30* (2020.02); *B60W 2555/60* (2020.02); *B60W 2556/40* (2020.02); *B60W 2556/60* (2020.02)

(58) Field of Classification Search
CPC .. B60W 50/14; B60W 40/072; B60W 40/105; B60W 2050/143; B60W 2552/30; B60W 2555/60; B60W 2556/60
See application file for complete search history.

(56) References Cited

U.S. PATENT DOCUMENTS

| | | | | |
|---|---|---|---|---|
| 6,373,400 | B1* | 4/2002 | Fujita | B60K 35/00 340/904 |
| 6,864,784 | B1* | 3/2005 | Loeb | G08G 1/096716 340/936 |
| 6,947,064 | B1* | 9/2005 | Hahn | G08G 1/0962 345/958 |
| 11,333,521 | B2* | 5/2022 | Yamaguchi | B60R 1/00 |
| 2004/0249535 | A1* | 12/2004 | Maass | G05D 1/0278 701/72 |
| 2006/0015241 | A1* | 1/2006 | Shima | B60K 31/0008 701/96 |

(Continued)

FOREIGN PATENT DOCUMENTS

DE 102019202581 8/2020

OTHER PUBLICATIONS

Extended Search Report for European Patent Application No. 22165735.6, dated Sep. 20, 2022, 8 pages.

*Primary Examiner* — Munear T Akki
(74) *Attorney, Agent, or Firm* — Sheridan Ross P.C.

(57) ABSTRACT

The disclosure relates to a control method for driver assistance. The method includes: receiving positioning information of a vehicle; obtaining information about a road structure ahead of the vehicle based on the positioning information; and determining, based on the information about the road structure, whether an alarm for a sharp bend is needed. The disclosure further relates to a control device for driver assistance, a computer storage medium, and a vehicle.

7 Claims, 2 Drawing Sheets

(56) References Cited

U.S. PATENT DOCUMENTS

| | | | |
|---|---|---|---|
| 2006/0085125 A1* | 4/2006 | Shibata | G01C 21/365 |
| | | | 701/414 |
| 2006/0287817 A1* | 12/2006 | Nagel | B60W 50/14 |
| | | | 701/507 |
| 2009/0112389 A1* | 4/2009 | Yamamoto | B60R 1/00 |
| | | | 701/31.4 |
| 2011/0071756 A1* | 3/2011 | Stahlin | H04W 4/02 |
| | | | 701/532 |
| 2013/0187772 A1* | 7/2013 | Akiyama | B62D 15/0265 |
| | | | 340/436 |
| 2013/0201335 A1* | 8/2013 | Heinemann | G06T 11/001 |
| | | | 348/148 |
| 2015/0123817 A1* | 5/2015 | Almalki | F03G 7/08 |
| | | | 700/287 |
| 2017/0066450 A1* | 3/2017 | Ko | B60W 30/10 |

* cited by examiner

CONTROL METHOD AND DEVICE FOR DRIVER ASSISTANCE

CROSS-REFERENCE TO RELATED APPLICATION

This application claims the benefit of China Patent Application No. 202110702159.8 filed Jun. 23, 2021, the entire disclosure of which is incorporated herein by reference in its entirety.

TECHNICAL FIELD

The disclosure relates to the field of control for driver assistance, and in particular, to a control method and device for driver assistance, a computer storage medium, and a vehicle.

BACKGROUND ART

During everyday driving, a specific proportion of traffic accidents happen on bends or other traffic scenarios with a poor field of vision. On the bends, a driver usually observes an external environment by himself/herself, determines how the environment is, and then performs a corresponding driving operation (for example, deceleration).

However, in a scenario in which a field of vision is limited due to a bend, a driver observing an external environment simply by himself/herself tends to make an erroneous determination and drives a vehicle into a bend at an excessively high speed, which poses potential safety risks.

SUMMARY OF THE DISCLOSURE

According to an aspect of the disclosure, there is provided a control method for driver assistance, the method including: receiving positioning information of a vehicle; obtaining information about a road structure ahead of the vehicle based on the positioning information; and determining, based on the information about the road structure, whether an alarm for a sharp bend is needed.

As a supplement or an alternative to the above solution, in the above method, the determining, based on the information about the road structure, whether an alarm for a sharp bend is needed includes: calculating a safe radius of curvature based on the information about the road structure; and determining, based on the safe radius of curvature, whether the alarm for a sharp bend is needed.

As a supplement or an alternative to the above solution, in the above method, the calculating a safe radius of curvature based on the information about the road structure includes: calculating a minimum value of a safe sight distance on a road; and calculating the safe radius of curvature based on the information about the road structure and the minimum value of the safe sight distance on the road.

As a supplement or an alternative to the above solution, in the above method, the calculating a minimum value of a safe sight distance on a road includes: calculating the minimum value of the safe sight distance on the road based on a value of a speed limit on the road or an actual vehicle speed of a current vehicle.

As a supplement or an alternative to the above solution, in the above method, the minimum value $L_{min}$ of the safe sight distance on the road is calculated according to the following formula: $L_{min}=0.08*spd^2+0.8393*spd-6$, where spd is the value of the speed limit on the road or the actual vehicle speed of the current vehicle.

As a supplement or an alternative to the above solution, in the above method, the calculating the safe radius of curvature based on the information about the road structure and the minimum value of the safe sight distance on the road includes: calculating the safe radius of curvature R according to $$R = \frac{L_{min}^2}{2W} + \frac{W}{2},$$

where $L_{min}$ is the minimum value of the safe sight distance on the road, and W is a width value of the road.

As a supplement or an alternative to the above solution, in the above method, the calculating the safe radius of curvature based on the information about the road structure and the minimum value of the safe sight distance on the road includes: calculating the safe radius of curvature R according to $$R = \frac{L_{min}^2}{8W} + \frac{W}{2},$$

where $L_{min}$ is the minimum value of the safe sight distance on the road, and W is a width value of the road.

As a supplement or an alternative to the above solution, in the above method, the width value W of the road is determined according to the following formula: W=a number of traffic lanes*3.75+a number of emergency lanes*3.5.

As a supplement or an alternative to the above solution, in the above method, the calculating a safe radius of curvature based on the information about the road structure includes: calculating the safe radius of curvature R based on the value of the speed limit on the road $spd_{roadLim}$ according to $R=-0.001*spd_{roadLim}^3+0.3393*sPd_{roadLim}^2-21.369*spd_{roadLim}+480$.

As a supplement or an alternative to the above solution, in the above method, the determining, based on the safe radius of curvature, whether the alarm for a sharp bend is needed includes: determining, when an actual radius of curvature of the road is less than the safe radius of curvature, that the alarm for a sharp bend is needed.

As a supplement or an alternative to the above solution, in the above method, the information about the road structure includes one or more of the actual radius of curvature of the road, a lane width, lane data, and a lane structure.

According to another aspect of the disclosure, there is provided a control device for driver assistance, the device including: a receiving apparatus configured to receive positioning information of a vehicle; an obtaining apparatus configured to obtain information about a road structure ahead of the vehicle based on the positioning information; and a determination apparatus configured to determine, based on the information about the road structure, whether an alarm for a sharp bend is needed.

As a supplement or an alternative to the above solution, in the above device, the determination apparatus includes: a calculation unit configured to calculate a safe radius of curvature based on the information about the road structure; and a determination unit configured to determine, based on the safe radius of curvature, whether the alarm for a sharp bend is needed.

As a supplement or an alternative to the above solution, in the above device, the calculation unit is configured to: calculate a minimum value of a safe sight distance on a road; and calculate the safe radius of curvature based on the information about the road structure and the minimum value of the safe sight distance on the road.

As a supplement or an alternative to the above solution, in the above device, the calculation unit is configured to: calculate the minimum value of the safe sight distance on the road based on a value of a speed limit on the road or an actual vehicle speed of a current vehicle.

As a supplement or an alternative to the above solution, in the above device, the calculation unit is configured to calculate the minimum value $L_{min}$ of the safe sight distance on the road according to the following formula:

$L_{min}=0.08*spd^2+0.8393*spd-6$, where spd is the value of the speed limit on the road or the actual vehicle speed of the current vehicle.

As a supplement or an alternative to the above solution, in the above device, the calculation unit is configured to calculate the safe radius of curvature R according to the following formula:

$$R = \frac{L_{min}^2}{2W} + \frac{W}{2},$$

where $L_{min}$ is the minimum value of the safe sight distance on the road, and W is a width value of the road.

As a supplement or an alternative to the above solution, in the above device, the calculation unit is configured to calculate the safe radius of curvature R according to the following formula:

$$R = \frac{L_{min}^2}{8W} + \frac{W}{2},$$

where $L_{min}$ is the minimum value of the safe sight distance on the road, and W is a width value of the road.

As a supplement or an alternative to the above solution, in the above device, the width value W of the road is determined according to the following formula: W=a number of traffic lanes*3.75+a number of emergency lanes*3.5.

As a supplement or an alternative to the above solution, in the above device, the calculation unit is configured to calculate the safe radius of curvature R based on the value of the speed limit on the road $spd_{roadLim}$ according to the formula $R=-0.001*spd_{roadLim}^3+0.3393*spd_{roadLim}^2-21.369*spd_{roadLim}+480$.

As a supplement or an alternative to the above solution, in the above device, the determination apparatus is configured to: determine, when an actual radius of curvature of the road is less than the safe radius of curvature, that the alarm for a sharp bend is needed.

As a supplement or an alternative to the above solution, in the above device, the information about the road structure includes one or more of the actual radius of curvature of the road, a lane width, lane data, and a lane structure.

According to still another aspect of the disclosure, there is provided a computer storage medium including instructions, where when the instructions are run, the method as described above is performed.

According to yet another aspect of the disclosure, there is provided a vehicle, including the device as described above.

In the control solution for driver assistance according to the embodiments of the disclosure, the positioning information of the vehicle is received, and the information about the road structure ahead of the vehicle is obtained based on the positioning information, such that it can be determined whether the alarm for a sharp bend is needed. The solution fills the gaps in dealing with sharp bends in the field of autonomous driving, and can allow for effective pre-warning of an environment with a sharp bend (and/or corresponding control of deceleration), thereby greatly reducing the accident rates on roads with sharp bends.

BRIEF DESCRIPTION OF THE DRAWINGS

The above and other objectives and advantages of the disclosure will be more thorough and clearer from the following detailed description in conjunction with the accompanying drawings, where the same or similar elements are represented by the same reference numerals.

DETAILED DESCRIPTION OF EMBODIMENTS

To make the objectives, technical solutions, and advantages of the disclosure clearer, specific embodiments of the disclosure will be described in further detail below with reference to the accompanying drawings. It can be understood that the specific embodiments described herein are used merely to explain the disclosure, rather than limit the disclosure.

In addition, it should also be noted that, for ease of description, the accompanying drawings show only parts related to the disclosure rather than all content of the disclosure. Before discussing exemplary embodiments in more detail, it should be noted that some exemplary embodiments are described as processes or methods that are depicted as flowcharts. Although the flowcharts describe various operations (or steps) as sequential processing, many of the operations may be implemented in parallel, concurrently, or simultaneously. In addition, the sequence of the operations may be rearranged. The processing may be terminated when its operations are completed, but it may also have additional steps not included in the accompanying drawings. The processing may correspond to methods, functions, procedures, subroutines, subprograms, and so on.

Although exemplary embodiments are described as using a plurality of units to perform exemplary processes, it should be understood that these exemplary processes may also be performed by one or more modules.

Moreover, control logic of the disclosure may be included on a computer-readable medium as executable program instructions, which are implemented by a processor or the like. Instances of the computer-readable medium include, but are not limited to, a ROM, a RAM, an optical disc, a magnetic tape, a floppy disk, a flash drive, a smart card, and an optical data storage apparatus. A computer-readable recording medium may also be distributed in a computer system connected to a network, so that the computer-readable medium is stored and implemented in a distributed manner, for example, through a vehicle telematics service or a controller area network (CAN).

Unless specifically mentioned or obvious from context, as used herein, the term "approximately" is understood to be within a range of normal tolerance in the art, for example, within two standard deviations of a mean.

It should be understood that the term "vehicle" or another similar term used herein includes general motor vehicles, such as passenger vehicles (including sport utility vehicles, buses, trucks, etc.) and various commercial vehicles, and includes hybrid vehicles, electric vehicles, etc. A hybrid vehicle is a vehicle with two or more power sources, such as a vehicle powered by a gasoline engine and an electric motor.

Control solutions for driver assistance according to various exemplary embodiments of the disclosure will be described below in detail with reference to the accompanying drawings.

Figure 1:
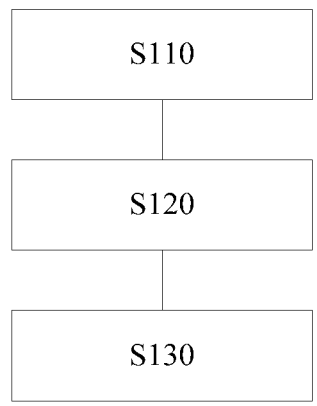
FIG. 1 is a schematic flowchart of a control method for driver assistance according to an embodiment of the disclosure.

FIG. 1 is a schematic flowchart of a control method 1000 for driver assistance according to an embodiment of the disclosure. As shown in FIG. 1, the control method 1000 for driver assistance includes the following steps:

step S110 of receiving positioning information of a vehicle;

step S120 of obtaining information about a road structure ahead of the vehicle based on the positioning information; and step S130 of determining, based on the information about the road structure, whether an alarm for a sharp bend is needed.

In the context of the disclosure, the "positioning information of a vehicle" may also be referred to as position information of the vehicle, where the information is used to signify a real-time position and/or a motion trajectory of the current vehicle. In one or more embodiments, the positioning information of the vehicle may be obtained by using a global positioning system (GPS). In an embodiment, the positioning information of the vehicle includes not only GPS information of the vehicle, and also includes lane navigation information.

The term "information about a road structure", as the name suggests, is various information for description of the road structure, which, for example, may be obtained from a high-definition map. In one or more embodiments, the information about the road structure includes one or more of the actual radius of curvature of the road, a lane width, lane data, and a lane structure.

In an embodiment, the obtaining information about a road structure ahead of the vehicle based on the positioning information in step S120 may include: searching and obtaining, based on the GPS information of the vehicle and the lane navigation information, road information on a high-definition map within a certain distance (for example, 2 km or 2.5 km, or within the range of other distances) ahead of a moving path in a lane, where the road information includes a road curvature, a lane width, lane data, a lane structure, and other necessary information about the road structure.

In an embodiment, step S130 may include: calculating a safe radius of curvature based on the information about the road structure; and determining, based on the safe radius of curvature, whether the alarm for a sharp bend is needed. In an embodiment, the calculating a safe radius of curvature based on the information about the road structure includes: calculating a minimum value of a safe sight distance on a road; and calculating the safe radius of curvature based on the information about the road structure and the minimum value of the safe sight distance on the road. In an embodiment, the determining, based on the safe radius of curvature, whether the alarm for a sharp bend is needed includes: determining, when an actual radius of curvature of the road is less than the safe radius of curvature, that the alarm for a sharp bend is needed.

The term "safe radius of curvature" in the context of the disclosure includes not only a safe radius of curvature estimated based on the information about the road structure and the minimum value of the safe sight distance on the road, and also includes a minimum radius of curvature of a circular curve of this section of road that is calculated based on the value of the speed limit on the road and that complies with national laws and regulations.

In an embodiment, a value of a safe sight distance required for driving on this section of road may be calculated based on the value of the speed limit on the road. Specifically, an estimation may be performed according to the following formula:

$$L_{minRoadSpdLim}=0.008*spd_{roadLim}^2+0.8393*spd_{roadLim}-6,$$

where $L_{minRoadSpdLim}$ is a minimum safe sight distance calculated based on a speed limit on the road, and $spd_{roadLim}$ is a value of the speed limit on the road provided on a high-definition map. It should be noted that the above formula is merely a specific example, and constant parameters in the formula may be changed according to actual engineering requirements.

In another embodiment, a value of a safe sight distance required for driving on this section of road may be calculated based on a value of an actual vehicle speed of the present vehicle. For example, an estimation may be performed according to the following formula:

$$L_{minVehSpd}=0.008*spd_{VehSpd}^2+0.8393*-spd_{VehSpd}-6,$$

where $L_{minVehSpd}$ is a minimum safe sight distance calculated based on a real-time vehicle speed, and $spd_{VehSpd}$ is a value of the real-time vehicle speed of the vehicle. Similarly, the above formula is merely a specific example, and constant parameters in the formula may be changed according to actual engineering requirements.

In an embodiment, in a comparatively conservative solution, it may be required that there still should be a sufficient sight distance for safety when the vehicle travels in the innermost lane on a bend. For example, the safe radius of curvature R may be calculated according to $$R = \frac{L_{min}^2}{2W} + \frac{W}{2},$$

where $L_{min}$ is the minimum value of the safe sight distance on the road, and W is a width value of the road. In another embodiment, in a comparatively aggressive solution, it is only required that there should be a sufficient sight distance for safety when the vehicle travels in the outermost lane on a bend. For example, the safe radius of curvature R may be calculated according to $$R = \frac{L_{min}^2}{8W} + \frac{W}{2},$$

where $L_{min}$ is the minimum value of the safe sight distance on the road, and W is a width value of the road. It should be noted that W in the above formula is the width value of the road, which may be estimated by the following formula based on information from the high-definition map: W=a number of traffic lanes*3.75+a number of emergency lanes*3.5.

It is understood by those skilled in the art that the constants used in the above formula may be calibrated according to engineering requirements. It should also be understood that the above method for calculating the width of the road is merely an example, which is not limited in the disclosure.

In still another embodiment, the safe radius of curvature R may be calculated according to a formula $R=-0.001*spd_{roadLim}^3+0.3393*spd_{roadLim}^2-21.369*spd_{roadLim}+480$, where $spd_{roadLim}$ is the value of the speed limit on the road.

In addition, those skilled in the art readily understand that the control method 1000 for driver assistance provided in the one or more embodiments of the disclosure may be implemented by a computer program. For example, when a computer storage medium (such as a USB flash drive) storing the computer program is connected to a computer, the control method for driver assistance according to one or more embodiments of the disclosure can be performed by running the computer program.

Figure 2:
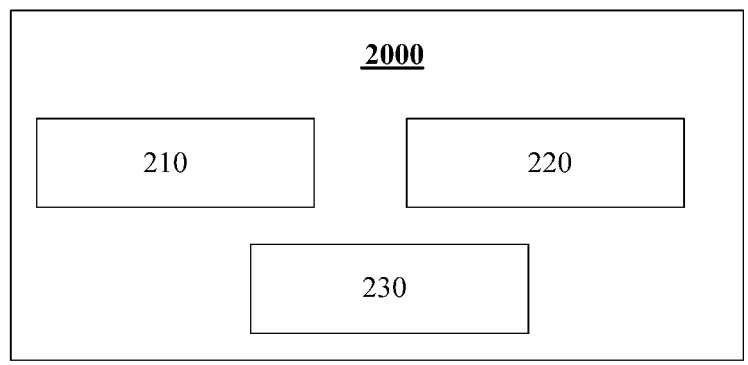
FIG. 2 is a schematic structural diagram of a control device for driver assistance according to an embodiment of the disclosure.

Referring to FIG. 2, FIG. 2 is a schematic structural diagram of a control device 2000 for driver assistance according to an embodiment of the disclosure. As shown in FIG. 2, the control device 2000 for driver assistance includes a receiving apparatus 210, an obtaining apparatus 220, and a determination apparatus 230. The receiving apparatus 210 is configured to receive positioning information of a vehicle; the obtaining apparatus 220 is configured to obtain information about a road structure ahead of the vehicle based on the positioning information; and the determination apparatus 230 is configured to determine, based on the information about the road structure, whether an alarm for a sharp bend is needed.

In the context of the disclosure, the "positioning information of a vehicle" may also be referred to as position information of the vehicle, where the information is used to signify a real-time position and/or a motion trajectory of the current vehicle. In one or more embodiments, the positioning information of the vehicle may be obtained by using a global positioning system (GPS). In an embodiment, the positioning information of the vehicle includes not only GPS information of the vehicle, and also includes lane navigation information.

The term "information about a road structure", as the name suggests, is various information for description of the road structure, which, for example, may be obtained from a high-definition map. In one or more embodiments, the information about the road structure includes one or more of the actual radius of curvature of the road, a lane width, lane data, and a lane structure.

In an embodiment, in the above device 2000, the obtaining apparatus 220 may be configured to search and obtain, based on the GPS information of the vehicle and the lane navigation information, road information on a high-definition map within a certain distance (for example, 2 km or 2.5 km, or within the range of other distances) ahead of a moving path in a lane, where the road information includes a road curvature, a lane width, lane data, a lane structure, and other necessary information about the road structure.

In an embodiment, although not shown in FIG. 2, the determination apparatus 230 includes: a calculation unit configured to calculate a safe radius of curvature based on the information about the road structure; and a determination unit configured to determine, based on the safe radius of curvature, whether the alarm for a sharp bend is needed. In an embodiment, the calculation unit is configured to: calculate a minimum value of a safe sight distance on a road; and calculate the safe radius of curvature based on the information about the road structure and the minimum value of the safe sight distance on the road. In an embodiment, the determination unit is configured to determine, when an actual radius of curvature of the road is less than the safe radius of curvature, that the alarm for a sharp bend is needed.

The term "safe radius of curvature" in the context of the disclosure includes not only a safe radius of curvature estimated based on the information about the road structure and the minimum value of the safe sight distance on the road, and also includes a minimum radius of curvature of a circular curve of this section of road that is calculated based on the value of the speed limit on the road and that complies with national laws and regulations.

In an embodiment, the calculation unit may be configured to calculate a value of a safe sight distance required for driving on this section of road based on the value of the speed limit on the road. Specifically, the calculation unit may perform an estimation according to the following formula:

$$L_{minRoadSpdLim}=0.008*spd_{roadLim}^2+0.8393*spd_{roadLim}-6,$$

where $L_{minRoadSpdLim}$ is a minimum safe sight distance calculated based on a speed limit on the road, and $spd_{roadLim}$ is a value of the speed limit on the road provided on a high-definition map. It should be noted that the above formula is merely a specific example, and constant parameters in the formula may be changed according to actual engineering requirements.

In another embodiment, the calculation unit may be configured to calculate a value of a safe sight distance required for driving on this section of road based on a value of an actual vehicle speed of the present vehicle. For example, the calculation unit may perform an estimation according to the following formula:

$$L_{minVehSpd}=0.008*spd_{VehSpd}^2+0.8393*spd_{VehSpd}-6,$$

where $L_{minVehSpd}$ is a minimum safe sight distance calculated based on a real-time vehicle speed, and $spd_{VehSpd}$ is a value of the real-time vehicle speed of the vehicle. Similarly, the above formula is merely a specific example, and constant parameters in the formula may be changed according to actual engineering requirements.

In an embodiment, in a comparatively conservative solution, it may be required that there still should be a sufficient sight distance for safety when the vehicle travels in the innermost lane on a bend. For example, the calculation unit may calculate the safe radius of curvature R according to $$R = \frac{L_{min}^2}{2W} + \frac{W}{2},$$

where $L_{min}$ is the minimum value of the safe sight distance on the road, and W is a width value of the road. In another embodiment, in a comparatively aggressive solution, it is only required that there should be a sufficient sight distance for safety when the vehicle travels in the outermost lane on a bend. For example, the calculation unit may calculate the safe radius of curvature R according to $$R = \frac{L_{min}^2}{8W} + \frac{W}{2},$$

where $L_{min}$ is the minimum value of the safe sight distance on the road, and W is a width value of the road. It should be noted that W in the above formula is the width value of the road, which may be estimated by the following formula based on information from the high-definition map: W=a number of traffic lanes*3.75+a number of emergency lanes*3.5.

It is understood by those skilled in the art that the constants used in the above formula may be calibrated according to engineering requirements. It should also be understood that the above method for calculating the width of the road is merely an example, which is not limited in the disclosure.

In still another embodiment, the calculation unit may calculate the safe radius of curvature R according to a formula $R=-0.001*spd_{roadLim}^3+0.3393*spd_{roadLim}^2-21.369*spd_{roadLim}+480$, where $spd_{roadLim}$ is the value of the speed limit on the road.

In one or more embodiments, the control device 2000 for driver assistance may be integrated in ADAS systems. ADAS systems may also be referred to as advanced driver assistance systems. The advanced driver assistance systems use a variety of sensors (such as a millimeter-wave radar, a laser radar, a monocular/binocular camera, and satellite navigation) mounted on an automobile to sense the surrounding environment at any time during traveling of the automobile, collect data, identify, monitor, and track a still/moving object, and perform system operations and analysis in combination with navigation map data, allowing for a driver to be aware of potential dangers in advance, thereby effectively improving the comfort and safety of the automobile during traveling. In an embodiment, the advanced driver assistance systems include a traffic message channel (TMC) system, an intelligent speed adaptation or intelligent speed advice (ISA) system, a vehicular communication system, an adaptive cruise control (ACC) system, a lane departure warning system (LDWS), a lane keeping assistance system, a collision avoidance system or a pre-crash system, a night vision system, an adaptive light control system, a pedestrian protection system, an automatic parking system, a traffic sign recognition system, a blind spot detection system, a driver drowsiness detection system, a hill descent control system, and an electric vehicle warning sounds system.

In one or more embodiments, the control device 2000 for driver assistance is included in a controller of ADAS. Various control operations within the control device 2000 for driver assistance may be performed periodically, and a performance period may be dependent on an operation period of the controller of ADAS. During each performance, in an embodiment, road information within a given distance (that may be calibrated as needed) ahead of the vehicle may be traversed, and a minimum value of a safe sight distance on a road is then estimated.

Figure 3:
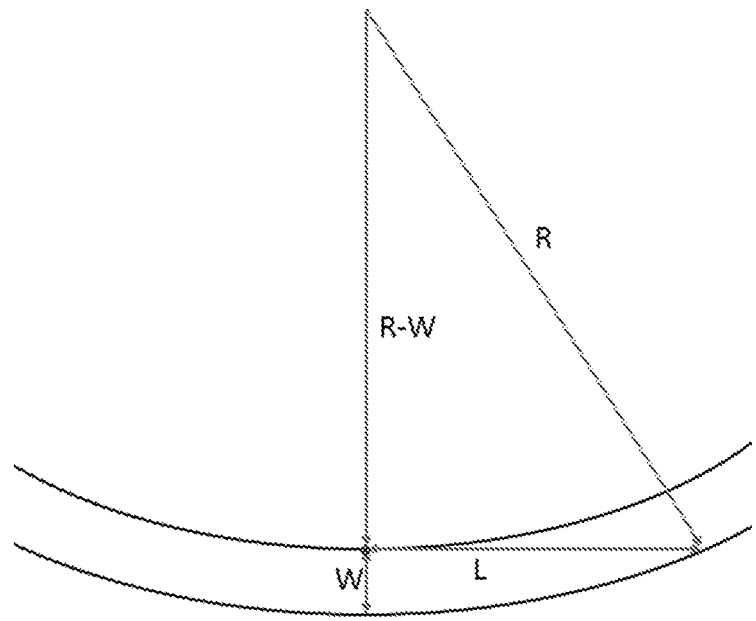
FIG. 3 is a schematic diagram of a conservative method for calculating a safe radius of curvature according to an embodiment of the disclosure.

Upon obtaining of the minimum value of the safe sight distance on the road, a required safe radius of curvature may be further estimated based on information about a road structure. For example, in a conservative solution, it may be required that there still should be a sufficient sight distance for safety when the vehicle travels in the innermost lane on a bend. For example, referring to FIG. 3, the radius of curvature of the road is calculated according to the following formula: $(R-W)^2+L^2=R^2$. It can be learned that a conservative estimation of a safe radius of curvature of the road based on a speed limit on the road is:

$$R = \frac{L^2}{2W} + \frac{W}{2} \geq \frac{L_{minRoadSpdLim}^2}{2W} + \frac{W}{2}. \qquad \text{(Inequation 1)}$$

In addition, a conservative estimation of a safe radius of curvature of the road based on a real-time vehicle speed is:

$$R = \frac{L^2}{2W} + \frac{W}{2} \geq \frac{L_{minVehSpd}^2}{2W} + \frac{W}{2}. \qquad \text{(Inequation 2)}$$

Figure 4:
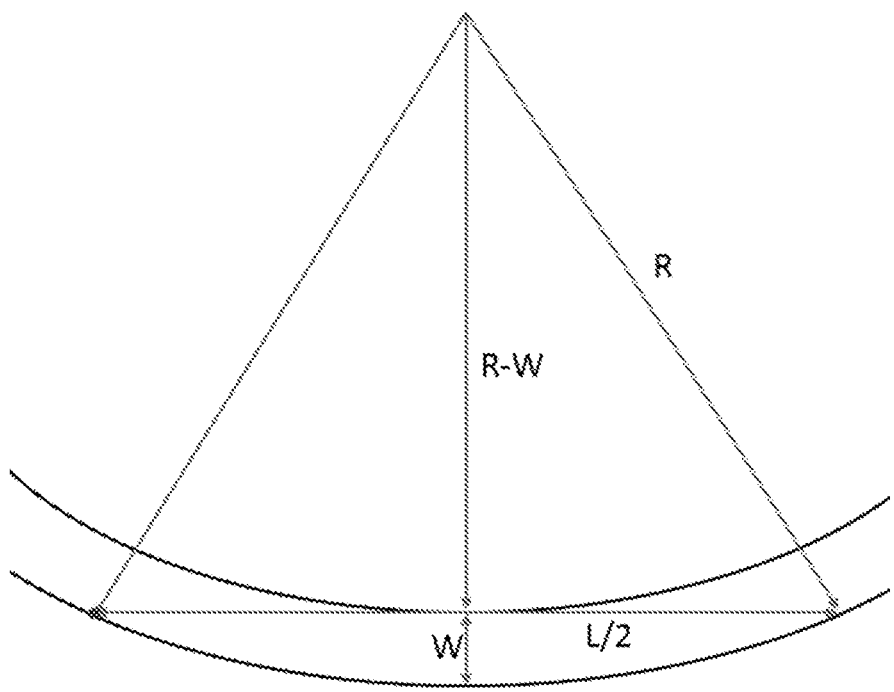
FIG. 4 is a schematic diagram of an aggressive method for calculating a safe radius of curvature according to an embodiment of the disclosure.

For another example, in an aggressive solution, it may be required that there still should be a sufficient sight distance for safety when the vehicle travels in the outermost lane on a bend. For example, referring to FIG. 4, the radius of curvature of the road is calculated according to the following formula:

$$(R-W)^2 + \left(\frac{L}{2}\right)^2 = R^2.$$

It can be learned that an aggressive estimation of a safe radius of curvature of the road based on a speed limit on the road is:

$$R = \frac{L^2}{8W} + \frac{W}{2} \geq \frac{L_{minRoadSpdLim}^2}{8W} + \frac{W}{2}. \qquad \text{(Inequation 3)}$$

In addition, an aggressive estimation of a safe radius of curvature of the road based on a real-time vehicle speed is:

$$R = \frac{L^2}{8W} + \frac{W}{2} \geq \frac{L_{minVehSpd}^2}{8W} + \frac{W}{2}. \qquad \text{(Inequation 4)}$$

It should be noted that the "safe radius of curvature" in the context of the disclosure may be estimated not only based on information about the road structure and the minimum value of the safe sight distance on the road, and may also be calculated based on the value of the speed limit on the road. In an embodiment, a minimum safe radius of curvature of the road may be calculated according to the following formula:

$$R_{min}=-0.001*spd_{roadLim}^3+0.3393*spd_{roadLim}^2-21.369*spd_{roadLim}+480,$$

where $spd_{roadLim}$ represents the value of the speed limit on the road. In this embodiment, a value of a radius of curvature of the road $R_{road}$ provided on a high-definition map should not be less than $R_{min}$, that is, $$R_{road} \geq R_{min} \qquad \text{(Inequation 5).}$$

In the above embodiment, different warning or alarm conditions may be selected according to different situations. For example, upon selection of a conservative warning condition, a warning may be sent when any one of the inequation 1, the inequation 2, and the inequation 5 cannot be satisfied. For another example, upon selection of an aggressive warning condition, a warning may be sent when any one of the inequation 3, the inequation 4, and the inequation 5 cannot be satisfied.

In conclusion, in the control solution for driver assistance according to the embodiments of the disclosure, the positioning information of the vehicle is received, and the information about the road structure ahead of the vehicle is obtained based on the positioning information, such that it can be determined whether the alarm for a sharp bend is needed. The solution fills the gaps in dealing with sharp bends in the field of autonomous driving, and can allow for effective pre-warning of an environment with a sharp bend (and/or corresponding control of deceleration), thereby greatly reducing the accident rates on roads with sharp bends and improving driving safety.

Although only some embodiments of the disclosure are described in the specification, it will be appreciated by those skilled in the art that the disclosure may be embodied in many other forms without departing from the essence and scope thereof. Accordingly, the presented examples and implementations are considered to be illustrative rather than restrictive, and the disclosure may encompass various modifications and substitutions without departing from the spirit and scope of the disclosure that are defined by the appended claims.

The invention claimed is:

1. A control method for driver assistance, comprising:
by a controller
receiving positioning information of a vehicle;
obtaining information about a road structure ahead of the vehicle based on the positioning information; and
determining, based on the information about the road structure, whether an alarm for a sharp bend is needed, wherein the determining, based on the information about the road structure, whether an alarm for a sharp bend is needed comprises:
calculating a safe radius of curvature based on the information about the road structure by calculating a minimum value of a safe sight distance on a road and calculating the safe radius of curvature based on the information about the road structure and the minimum value of the safe sight distance on the road.

2. The method according to claim 1, wherein the determining, based on the information about the road structure, whether an alarm for a sharp bend is needed comprises:
determining, based on the safe radius of curvature, whether the alarm for a sharp bend is needed.

3. The method according to claim 2, wherein the calculating a minimum value of a safe sight distance on a road comprises:
calculating the minimum value of the safe sight distance on the road based on a value of a speed limit on the road or an actual vehicle speed of a current vehicle.

4. A control device for driver assistance, comprising:
a receiving apparatus of a controller configured to receive positioning information of a vehicle;
an obtaining apparatus of the controller configured to obtain information about a road structure ahead of the vehicle based on the positioning information; and
a determination apparatus of the controller configured to determine, based on the information about the road structure, whether an alarm for a sharp bend is needed, wherein the determination apparatus comprises a calculation unit configured to calculate a safe radius of curvature based on the information about the road structure and wherein the calculation unit is configured to calculate a minimum value of a safe sight distance on a road; and calculate the safe radius of curvature based on the information about the road structure and the minimum value of the safe sight distance on the road.

5. The device according to claim 4, wherein the determination apparatus comprises:
a determination unit configured to determine, based on the safe radius of curvature, whether the alarm for a sharp bend is needed.

6. The device according to claim 4, wherein the calculation unit is configured to:
calculate the minimum value of the safe sight distance on the road based on a value of a speed limit on the road or an actual vehicle speed of a current vehicle.

7. A non-transitory computer storage medium, comprising instructions, wherein when the instructions are run, a control method for driver assistance is performed, the method comprising:
by a controller
receiving positioning information of a vehicle;
obtaining information about a road structure ahead of the vehicle based on the positioning information; and
determining, based on the information about the road structure, whether an alarm for a sharp bend is needed, wherein the determining, based on the information about the road structure, whether an alarm for a sharp bend is needed comprises calculating a safe radius of curvature based on the information about the road structure by calculating a minimum value of a safe sight distance on a road and calculating the safe radius of curvature based on the information about the road structure and the minimum value of the safe sight distance on the road.

* * * * *